Aug. 15, 1967           J. O. NELSON           3,335,610
SAFETY DEVICE FOR PRESSURE GAUGES
Filed May 14, 1965
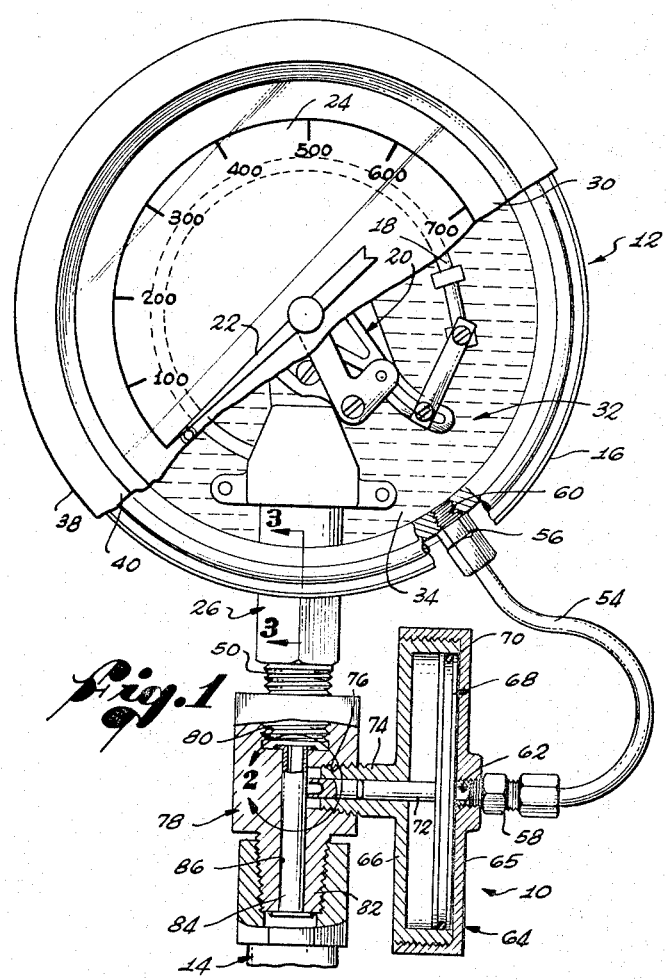
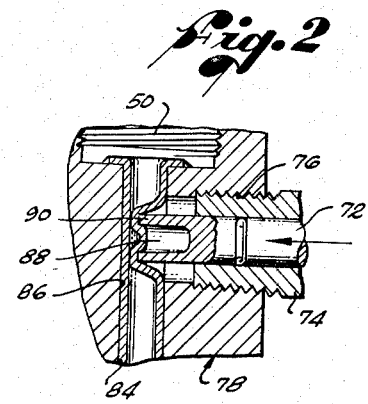
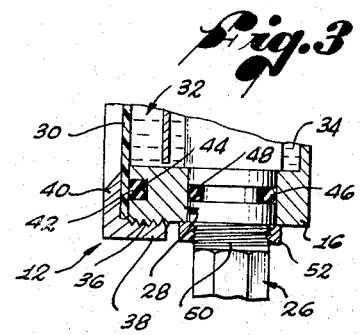
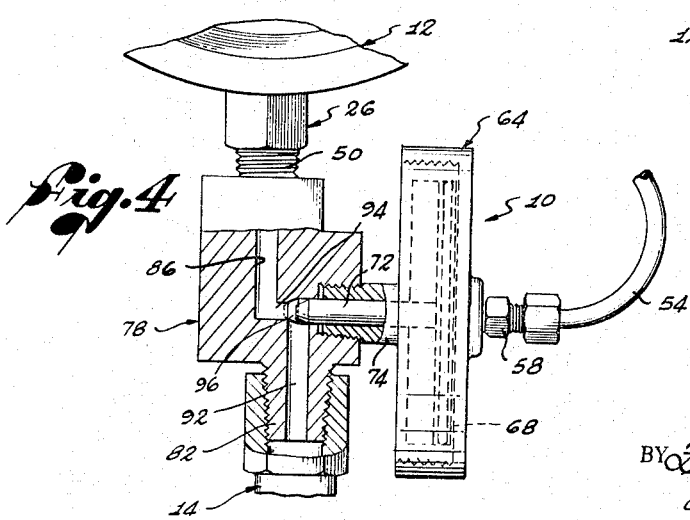
INVENTOR.
JORD O. NELSON
BY Fulwider, Patton, Rieber
Lee, and Utecht
ATTORNEYS

United States Patent Office 3,335,610
Patented Aug. 15, 1967

3,335,610
SAFETY DEVICE FOR PRESSURE GAUGES
Jord O. Nelson, Paramount, Calif., assignor to
Eltra Corporation, Toledo, Ohio
Filed May 14, 1965, Ser. No. 455,689
5 Claims. (Cl. 73—416)

ABSTRACT OF THE DISCLOSURE

A safety device for a pressure gauge whose pressure responsive element is mounted in a fluid chamber filled with hydraulic fluid, having a conduit in communication with the pressure responsive element which can be closed by a movable member of a pressure actuated means in communication with the fluid chamber, so that when the pressure responsive element is ruptured, fluid pressure will increase in the fluid chamber to move the movable member of the pressure actuated means to close the conduit to the pressure responsive element.

---

The present invention relates to fluid pressure measuring apparatus and more particularly to a safety device which prevents the undesired and often dangerous leakage of fluid from an associated pressure gauge.

It is common in petroleum refineries and in chemical as well as numerous other industrial and military plants to pipe inflammable gases, oil, chemicals and other fluids under relatively high pressures. It is, of course, important to keep a constant check on the fluid pressure and to maintain the pressure within safe limits. To this end, it is usual practice to continuously meter line pressure throughout such piping systems. For this purpose fluid pressure gauges are usually connected to the pipe lines at predetermined check stations in the system. Because of their relative low cost and freedom from operational limitations, such gauges are usually of an expandable metallic-element type including a Bourdon tube, diaphragm or bellows as the pressure-sensitive element.

Although such gauges provide an accurate measure of line pressure, they unfortunately present a rather grave safety problem in that with continuous use, the pressure-sensitive elements tend to crack or split and allow high pressure fluid to leak to the surrounding case. The surrounding case usually does not provide an air-tight seal. Therefore, the fluid leaking from the pressure-sensitive element freely passes from the faulty gauge. In the case of gases, they collect in the area surrounding the gauge. Oil, chemicals and other liquids, however, squirt freely from the gauge to literally blanket the immediate area, often carrying to points far distant from the faulty gauge. The same result eventually occurs even if the surrounding case is sealed, since the build-up of high pressure fluid within the case eventually causes the seal to give way thereby allowing the fluid to leak from the gauge.

Usually the leak is small and goes undetected by a monitoring of the entire piping system. Unfortunately, however, small leaks can, and often do, produce large concentrations of inflammable gas around a faulty gauge. It goes without saying that such conditions are extremely dangerous—the periodic explosions and fires at refineries traceable to such faults being vivid evidence of this fact. Also, the spraying of oil and some chemicals from a faulty gauge often requires the repainting or replacement of surrounding structures while the leakage of other chemicals seriously endangers the health of those in the immediate area.

In the past, attempts have been made to rectify the safety problem surrounding such pressure gauges by adding special seals and airtight sealing combinations. Unfortunately, such steps have proven rather unsatisfactory. Not only are the special seals and sealing combinations expensive, but they have proven to be rather unreliable in their operation.

Accordingly, it is a major object of the present invention to provide a foolproof safety device for preventing the undesired leakage of fluids from pressure gauges.

Another object of the present invention is to provide a foolproof safety device of the foregoing type which is automatic and extremely rapid in its operation.

A further object of the present invention is to provide a safety device for preventing leaks from pressure gauges which, in itself, does not present a source of possible fluid leakage from the associated pressure gauge or from the fluid system to which it is attached.

Still another object of the present invention is to provide a simple, inexpensive and long lasting safety device of the foregoing type which is readily attachable to conventional fluid pressure gauges.

The foregoing, as well as other objects and advantages of the present invention, may be more clearly understood by reference to the following detailed description when taken with the drawing, which illustrates, by way of example only, a Bourdon tube pressure gauge in combination with two forms of safety devices embodying the features of the present invention.

In the drawing:
FIGURE 1 is a plan view of the safety device in combination with a pressure gauge, portions of the safety device being broken away to illustrate its inner construction;

FIGURE 2 is an enlarged view of the portion of FIGURE 1 encircled by the arrow 2;

FIGURE 3 is a fragmentary sectional view taken along the line 3—3 in FIGURE 1; and FIGURE 4 is a sectional side view of an alternate form of the safety device.

In the drawing, the safety device is represented generally by the numeral 10 and in FIGURE 1 is illustrated in combination with and connected to a fluid pressure measuring gauge 12. Generally speaking, the safety device 10 is designed to immediately and automatically block a conduit 14 to prevent further flow of fluid to the pressure-sensitive element of the gauge 12 immediately upon the leakage of any of the fluid from the pressure-sensitive element.

The pressure gauge 12 is illustrated, by way of example only, as being of a Bourdon tube type including an outer case 16 housing a C-shaped Bourdon tube 18. A conventional linkage mechanism 20 is connected between the sealed end of the Bourdon tube and a pressure indicating needle 22. The linkage mechanism 20 selectively positions the needle over a scale 24 in accordance with the pressure of the fluid supplied to the open end of the tube through a socket member 26 sealed within a bottom opening 28 in the case.

The case 16 is generally cup-shaped and has a transparent front cover 30 enclosing and sealing a chamber 32 to prevent the leakage of a hydraulic fluid 34 which fills the case and submerges the Bourdon tube 18. To this end, the outer rim 36 of the case is threaded and receives a ring 38 having a centrally extending flange 40. The transparent front cover 30 is stationed between the flange 40 and the front of the case. By proper adjustment of the ring, the flange 40 engages the front of the plate 30 and presses the plate against the front of the case to compress an O-ring 42 stationed in an annular recess 44 in the front of the case, thereby creating an airtight seal between the plate and the case.

A similar airtight seal is provided between the bottom opening 28 in the case and the socket 26. In this regard, an O-ring 46 is stationed in an annular recess 48 around the stem 50 of the socket and presses against the inside of the opening 28. Also, a collar 52 mates with an externally-threaded portion of the stem and presses upward against the bottom of the case 16 to secure the stem in position.

The connection of the safety device 10 to the pressure gauge 12 does not alter the airtight seal of the case 16. In this regard, the safety device 10 includes a tube 54 having externally-threaded connectors 56 and 58 at either end. The connector 56 is secured tightly within a threaded side opening 60 in the case 16 to provide a flow path for the hydraulic fluid 34 into the main body of the safety device. The connector 58, on the other hand, is tightly secured within a threaded end opening 62 of a piston-supporting cylinder 64. The piston-supporting cylinder 64 is formed by a pair of threadedly engaging cup-shaped members 65 and 66 and supports a relatively thin disc-shaped piston 68 for sliding movement therein. An O-ring 70 is seated within and extends around the periphery of the piston 68 in tight engagement with the inner surface of the cylinder to prevent leakage of the hydraulic fluid around the piston.

A plunger 72 extends from the left side of the piston 68 and is supported for a longitudinal sliding movement within an externally-threaded neck 74 extending from the back of the cup-shaped member 66.

The neck 74 is threadedly received by a horizontal side opening 76 in a conduit fitting 78. The fitting 78 includes an internally-threaded top bore 80 and an externally-threaded bottom stem 82. The top bore 80 is adapted to threadedly engage and tightly connect the fitting to the bottom portion of the stem 50 while the bottom stem 82 is adapted to fit into and tightly connect the fitting into the conduit 14 leading from the gas piping system to the pressure gauge 12.

In the preferred form of the fitting 76, a short length of malleable tubing 84 is stationed within a vertical bore 86 communicating with the horizontal side opening 76. The malleable tubing 84 is soldered in place top and bottom as indicated. The end of the plunger 72 extends beyond the end of the neck 74 and normally engages the tubing 82. However, since the hydraulic fluid 34 within the case 16 and tube 54 is normally at atmospheric pressure, the forces acting on the piston 68 are substantially balanced and the end of the plunger just rests against but does not in any way compress the malleable tubing.

If a leak occurs within the case 16 however, either because of the crack or split in the Bourdon tube 18 or a leak around the connection of the Bourdon tube to the socket 26, the high pressure fluid being monitored passes into the case. The high pressure of the fluid is immediately transmitted by the hydraulic fluid 34 to develop a relatively large force on the right face of the piston 68. In response to the force, the piston rapidly slides to the left within the cylinder 64 to cause the plunger to deform the tubing 84 to block further fluid flow to the gauge 12. When this occurs the needle 22 moves to a zero pressure reading to indicate that the gauge has failed.

As illustrated most clearly in FIGURE 2, the tip end of the plunger 76 includes a central recess 88 defining an annular chisel 90 which crimps the malleable tubing 84 as illustrated, to completely block further flow of high-pressure fluid to the gauge. Thus, immediately upon the occurrence of a leak of high-pressure fluid within the case 16, the gauge is effectively disconnected from the piping system before the high-pressure fluid has a chance to leak from the gauge to the surrounding area. In this way, the operation of the safety device prevents the dangerous build-up of inflammable gas around a faulty gauge or the squirting of oil, chemicals or other liquids from the gauge.

In this regard, it should be noted that the preferred form of the safety device does not, in itself, represent a possible source of fluid leakage either from the gauge 12 or from the piping system to which it is connected. Rather, the preferred form of the safety device is separate and at all times completely isolated from the conduit providing the fluid path to the gauge. This is true both before as well as after operation of the safety device.

An alternate form of the safety device is illustrated in FIGURE 4, with like reference numerals indicating parts corresponding to those illustrated in FIGURES 1, 2 and 3. The alternate form of the safety device is very similar to that previously described. The main difference resides in the conduit fitting 78 which here includes a generally L-shaped port 92 leading from the gas conduit 14 to the stem 50 of the socket 26. The side opening 76 is aligned with the horizontal leg 94 of the port 92 and provides a sliding path for the end of the plunger 72 into the leg 94 to engage a seat 96 and block the port 92 upon the occurrence of a leak in the Bourdon tube.

In view of the foregoing, it is appreciated that the present invention provides a foolproof safety device which is extremely rapid and automatic in its operation to prevent the leakage of high-pressure fluid from a pressure gauge. Further, the safety device is readily attachable to commercially available pressure gauges merely by the connection of the fitting 56 to the case of the gauge and the addition of the fitting 78 into the conduit 14 leading to the gauge. Moreover, the design of the safety device is extremely simple and inexpensive to manufacture.

In the foregoing, two forms of the safety device have been described. Changes and modifications may be made in the illustrated forms however, without departing from the scope of the invention. Further, the safety devices have been described in combination with a Bourdon tube pressure gauge. It is, of course, to be understood that the safety devices are equally applicable to different types of pressure gauges including different forms of pressure-sensitive developments. For example, the safety devices may be utilized with gauges employing a bellows or diaphragm forming a separate compartment within a surrounding case of the gauge with the fluid being measured being supplied to the compartment and the safety device operating in response to any high pressure fluid leakage from the compartment into the surrounding case.

In view of the possible modifications in the illustrated forms of the safety device as well as the potential use with different forms of pressure gauges, it is intended that the present invention be limited in scope only by the terms of the following claims.

I claim:

1. A pressure gauge, comprising:
   a housing defining a fluid chamber;
   a Bourdon tube stationed in said chamber;
   a fluid in said chamber surrounding said Bourdon tube;
   conduit means including a deformable tube passing fluid, the pressure of which is to be measured to said Bourdon tube;
   and means for deforming said deformable tube to block fluid flow to said Bourdon tube in response to fluid leaks from said Bourdon tube into said chamber, said deforming means including a piston receiving cylinder generally normal to said deformable tube with one end open to said chamber, a piston supported for sliding movement in said cylinder adjacent the end open to said chamber, and a plunger extending from said cylinder with an end adjacent said deformable tube.

2. A pressure gauge comprising a housing defining a fluid chamber having a transparent wall, a pressure responsive member positioned in said chamber having a movable indicator means visible through said transparent wall, hydraulic fluid in said chamber surrounding said pressure responsive member, conduit means connected to said pressure responsive member for transmitting fluid thereto, the pressure of which is to be measured, and pressure actuated means connected with said fluid chamber having a movable member cooperating with the conduit means whereby rupture of the pressure responsive member causes fluid leakage into said chamber to increase the pressure of the hydraulic fluid in the chamber which actuates the movable member of the pressure actuated means to block the conduit means to prevent further flow of fluid to the ruptured pressure responsive member.

3. The device defined in claim 2 further characterized by providing the conduit means with a deformable section which is adopted to be displaced by the movable member of the pressure actuated means.

4. The device defined in claim 2, wherein the pressure responsive member is a Bourbon tube.

5. The device defined in claim 2, further characterized by having the movable member cooperating in a transverse direction with the conduit means.

References Cited

UNITED STATES PATENTS 2,413,087 12/1946 Urbany.
2,786,608 3/1957 Brown _____ 251—7 X LOUIS R. PRINCE, *Primary Examiner.*

D. O. WOODIEL, *Assistant Examiner.*